(12) United States Patent
Liu

(10) Patent No.: US 8,657,478 B2
(45) Date of Patent: *Feb. 25, 2014

(54) BACKLIGHT MODULE

(71) Applicant: AU Optronics Corp., Hsin-Chu (TW)

(72) Inventor: Pang-Hsuan Liu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,496

(22) Filed: Mar. 20, 2013

(65) Prior Publication Data

US 2013/0215641 A1  Aug. 22, 2013

Related U.S. Application Data

(60) Division of application No. 12/616,791, filed on Nov. 12, 2009, now Pat. No. 8,408,776, which is a continuation of application No. 11/755,730, filed on May 30, 2007, now Pat. No. 7,658,530.

(30) Foreign Application Priority Data

Dec. 6, 2006 (TW) ............................... 95145477 A

(51) Int. Cl.
  *F21V 7/04* (2006.01)

(52) U.S. Cl.
  USPC ........... 362/606; 362/612; 362/613; 362/616; 362/625; 362/626

(58) Field of Classification Search
  USPC ............ 349/65; 362/606, 612, 613, 616, 618, 362/620, 625, 626, 628; 385/901
  See application file for complete search history.

(56) References Cited

U.S. PATENT DOCUMENTS

| | | | |
|---|---|---|---|
| 5,128,781 A | 7/1992 | Ohno | |
| 6,672,734 B2 | 1/2004 | Lammers | |
| 6,927,812 B2 | 8/2005 | Cho | |
| 6,989,873 B2 | 1/2006 | Hua-Nan et al. | |
| 7,413,334 B2 | 8/2008 | Baba | |
| 7,658,530 B2 * | 2/2010 | Liu | 362/606 |
| 2006/0044834 A1 | 3/2006 | Yu | |
| 2006/0221638 A1 | 10/2006 | Chew | |
| 2006/0262564 A1 | 11/2006 | Baba | |
| 2007/0165419 A1* | 7/2007 | Horiuchi et al. | 362/606 |

FOREIGN PATENT DOCUMENTS

| | | |
|---|---|---|
| JP | 2006140078 | 6/2006 |
| JP | 2006156324 | 6/2006 |
| JP | 2006302687 | 11/2006 |
| TW | 585275 | 4/2004 |
| TW | M278907 | 10/2005 |

* cited by examiner

*Primary Examiner* — Stephen F Husar
(74) *Attorney, Agent, or Firm* — Winston Hsu; Scott Margo

(57) ABSTRACT

A backlight module includes a light guide plate, a light source disposed at a side of the light guide plate, a diffuser sheet positioned over the light guide plate but not directly contacting the light guide plate, and a light mixing space positioned between the light guide plate and the diffuser sheet so that light emitted from the light guide plate mixes in the light mixing space before being emitted out of the backlight module.

10 Claims, 6 Drawing Sheets

BACKLIGHT MODULE

CROSS REFERENCE TO RELATED APPLICATIONS

This patent application is a division application and claims priority of U.S. patent application Ser. No. 12/616,791, filed on Nov. 12, 2009, now U.S. Pat. No. 8,408,776, which itself is a continuation application and claims priority of U.S. patent application Ser. No. 11/755,730, filed on May 30, 2007, now U.S. Pat. No. 7,658,530, which claims the foreign priority of Taiwan Pat. application Ser. No. 095145477, the contents of which are hereby incorporated by reference in their entirety.

BACKGROUND OF THE INVENTION

1. Field of the Invention

The present invention relates to a backlight module, and more particularly to a backlight module comprising a light mixing space positioned between a light guide plate and a diffuser sheet.

2. Description of the Prior Art

As quality demands increase rapidly for display devices, LCDs are becoming a major type of display device, finding wide application in notebooks, personal digital assistants, digital cameras and other portable electronic products. Because the LCD is a passive illuminating display device, a backlight module is necessary to provide a light source.

A conventional backlight module of an LCD uses a cold cathode fluorescent lamp (CCFL) as the light source. Taking a direct-lighting type backlight module as an example, a plurality of CCFLs are positioned collaterally on the bottom of the backlight module to provide a plurality of line-like sources. A diffuser sheet, or a plurality of optical films, is placed on the CCFL to provide planar light with uniform brightness. The backlight module with the CCFL as the light source is a well developed technology, thus the diffuser and the optical film provide an efficient light source. However, the large size of the CCFL and the high illuminating heat are restrictions of LCDs. In addition, the CCFL contains mercury, which causes environment pollution. Therefore, light emitting diodes (LEDs), which have the advantages of high color saturation, quick reaction rate, and small size, are used widely in the backlight module as light sources. Research groups are still working on a backlight module incorporating LEDs for large-sized LCDs to replace the conventional cold cathode fluorescent lamp. Because the color saturation of white LEDs still needs to be improved, red LEDs, green LEDs, and blue LEDs are used together as the white light source in the backlight module. In this situation, a design with good light mixing is important for making the red, green, and blue light mix well. Therefore, the backlight module incorporating LEDs has a more complicated structure and higher price than a traditional backlight module incorporating CCFLs.

FIG. 1 shows a side view of a conventional backlight module incorporating LEDs. The backlight module 10 is a direct-lighting type backlight module applied to large size LCDs, such as a flat panel TVs. The backlight module comprises a frame 12, a diffuser sheet 20 positioned on the frame 12, and a plurality of top-emitting LED sources 14 positioned in the frame 12 and soldered on a printed circuit board (PCB) 18. The LED source 14 comprises a red LED, a blue LED, and a green LED positioned uniformly in the frame 12. After mixing the red, blue, and green light properly, a white light source can be provided. In addition, the conventional backlight module further comprises a reflective sheet 16 or reflective material positioned on the PCB 18. The thickness of a backlight module of a flat panel TV is approximately 2 cm. Therefore, in order to achieve uniform brightness, higher numbers of LED sources 14 with smaller current, such as 20 mA, are positioned in the backlight module 10. In this design, the light emitted by the LED sources 14 illuminates the luminous face of the backlight module 10 directly, so the light utility efficiency is higher and the heat dissipation is better, because the LED sources 14 are positioned uniformly. However, the increased number of LED sources 14 increases the cost of the backlight module 10. In addition, according to the structural design of the backlight module 10, the light cannot mix well. Furthermore, only a specific wavelength range or power of the red LED, blue LED, and green LED can be used in the LED source 14.

The conventional backlight module can also include a lower number of high-power LEDs, such as 350 mA LEDs, combined with special design prisms positioned on the surface of the LED to provide the light source. However, this design increases the thickness of the backlight module, and fans, heat pipes, or other heat dissipation devices are needed to help heat dissipation, so the cost is increased. In addition, special design prisms are usually patented, so the product cost of the backlight module is also increased.

As demonstrated in the above, designing an LED backlight module with low cost and good light mixing function is an important task for the backlight module industry.

SUMMARY OF THE INVENTION

It is therefore an objective of the present invention to provide a backlight module with a light mixing space and at least a light guide plate to solve the abovementioned problems.

The backlight module, according to the present invention, comprises a light guide plate; a light source positioned at a side of the light guide plate; a diffuser sheet positioned on the light guide plate; and a mixing space positioned between the light guide plate and the diffuser sheet. The light guide plate comprises a light-exit face and at least a light-incidence face. The light emitting from the light source enters the light guide plate from the light-incidence face. The diffuser sheet does not contact the light guide plate and the light source. In addition, the mixing space is positioned between the light guide plate and the diffuser sheet, so the light passing through the light-exit face can be mixed sufficiently in the light mixing space before being emitted from the backlight module.

The backlight module of the present invention comprises a light guide plate and the light source is positioned at a side of the light guide plate, so the light can be distributed properly through the light guide plate. Furthermore, the backlight module in the present invention comprises a light mixing space positioned between the light guide plate and the diffuser sheet to make the light mix sufficiently in the light mixing space before being emitted the backlight module so the white light with better color saturation can be generated.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
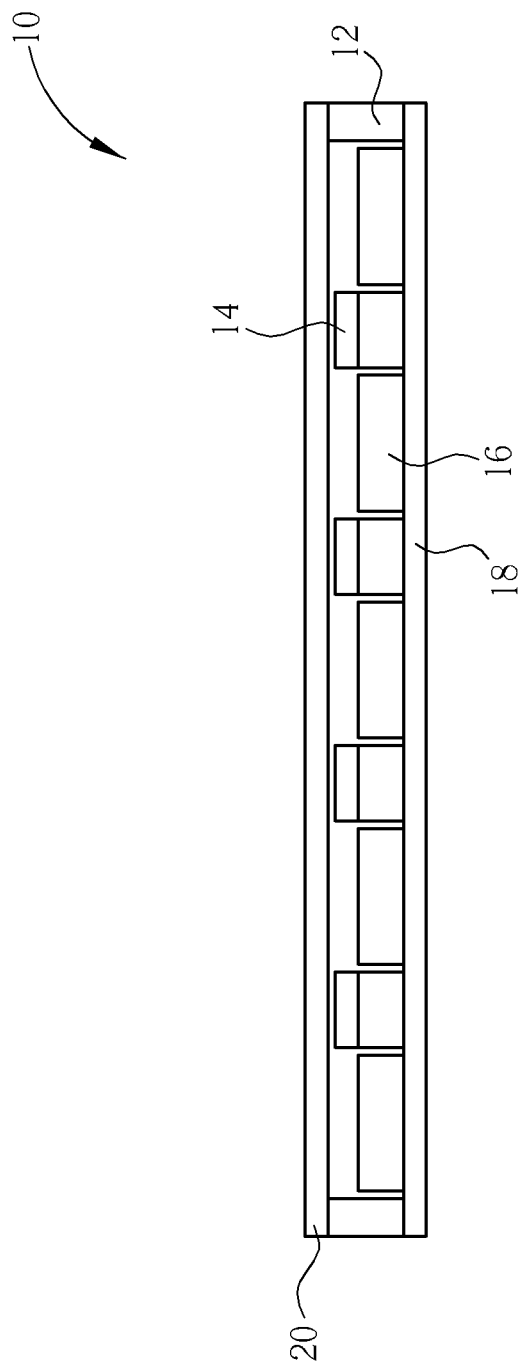
FIG. 1 shows a side view of the conventional backlight module incorporating LEDs.
Figure 2:
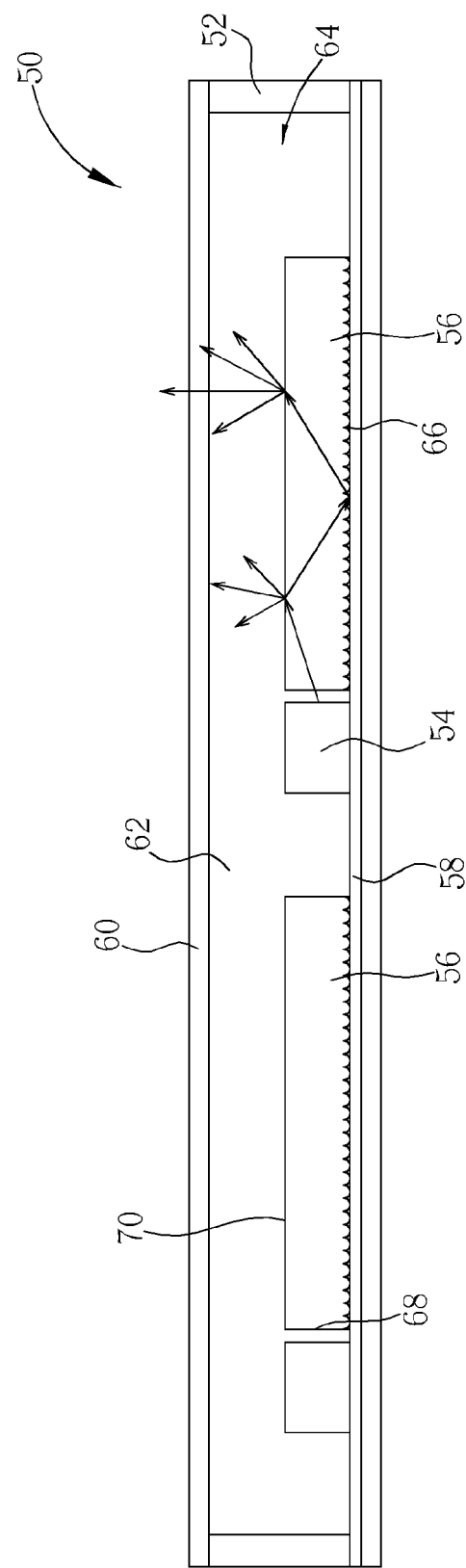
FIG. 2 depicts a side view of the backlight module in the first embodiment of present invention.
Figure 3:
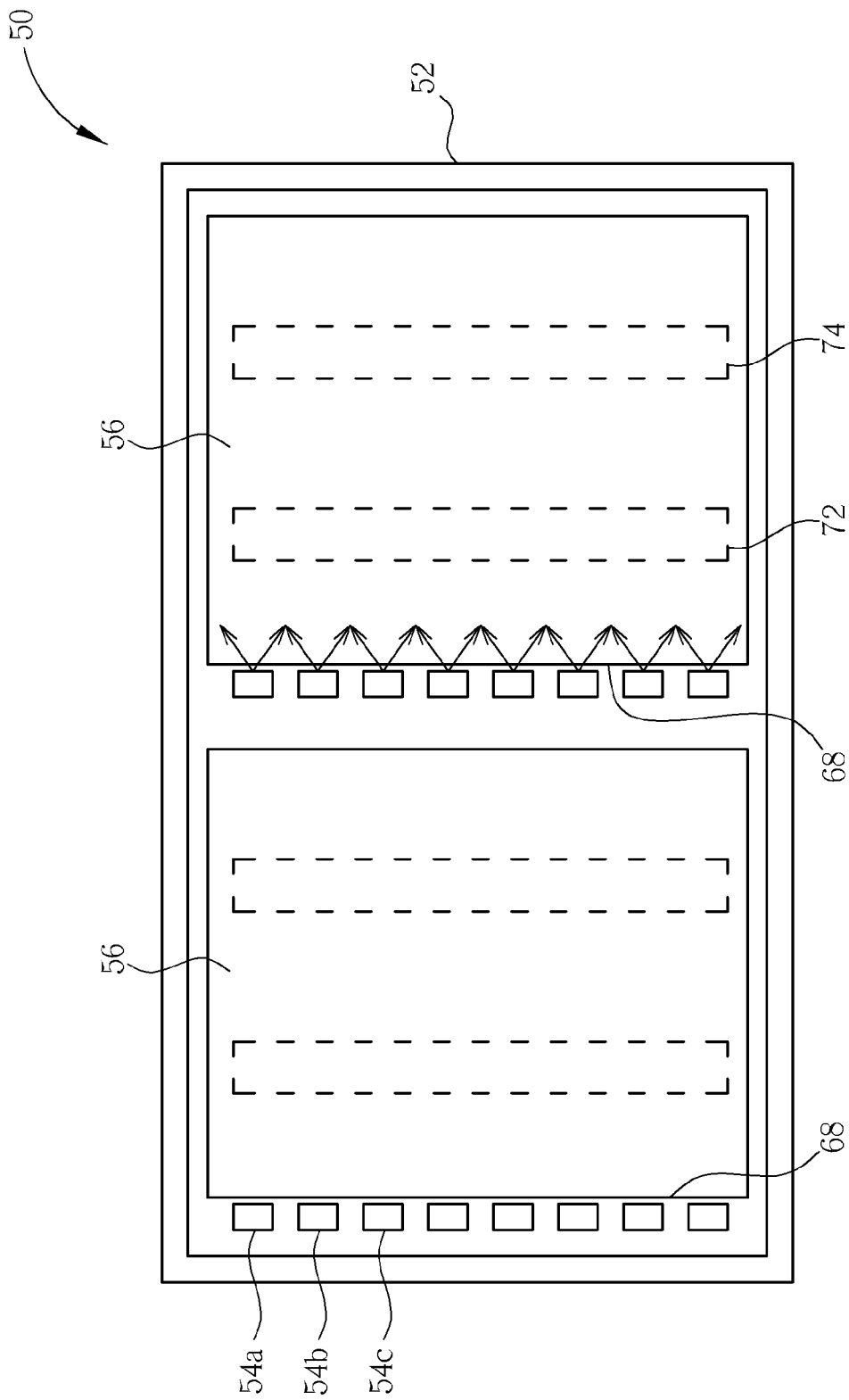
FIG. 3 depicts a top view of the backlight module in FIG. 2.

The backlight module of the present invention can be applied to LCDs or other display devices that require a light source. FIG. 2 depicts a side view of the backlight module in a first embodiment of the present invention while FIG. 3 depicts a top view of the backlight module in FIG. 2. The backlight module 50 in the present invention is a direct-lighting type, and can be applied to small-, medium-, and large-size LCDS. The backlight module 50 comprises a frame 52, a plurality of light guide plates 56 positioned in parallel at the bottom of the backlight module 50, a light source 54, a diffuser sheet 60, and a light mixing space 62. The frame 52 comprises at least four sidewalls forming a containing space 64 to hold the light source 54, the light guide plate 56, and the diffuser sheet 60.

Every light guide plate 56 comprises a light-incidence face 68 and a light-exit face 70 connected to each other perpendicularly, and the surface of each light guide plate 56 comprises a plurality of light guide patterns to guide light toward the light-exit face 70. The diffuser sheet 60 is positioned over the light guide plate 56 without contacting the light guide plate and the light source. The light source 54 is a point light source or a directional light source, such as a 100 mA LED, positioned next to a side of the light guide plate 56 to make the light emitting from the light source 54 enter the light guide plate 56 from the light-incidence face 68 and exit from the light-exit face 70 after scattering. Referring to FIG. 3, in this embodiment, the light source 54 comprises red LEDs 54a, green LEDs 54b, and blue LEDs 54c disposed alternately and in parallel on a side of the light-incidence face 68 of the diffuser sheet 54. However, the light source 54 can also be a white light source.

In addition, the light mixing space 70 is in a part of the containing space 64 surrounded by the diffuser sheet 60, the light source 54 and the light guide plate 56. This means that the light passing through the light-exit face 70 can be mixed sufficiently in the light mixing space 62 before being emitted from the backlight module 50 through the diffuser sheet 60. The backlight module 50 can further comprise a reflective sheet 58 positioned under the light source 54 and the light guide plate 56, in order to reflect the light proceeding to the bottom of the backlight module 50, such that the light utility efficiency is increased. In other embodiments, a plurality of optical films (not shown), such as prisms or brightness enhancement films (BEF), can be positioned on the diffuser sheet 60 to increase the brightness of the light provided by the backlight module.

As shown in FIG. 2, the light guide pattern 66 can be a V-shaped type or a U-shaped type positioned at the bottom of the light guide plate 56 to replace the BEF and making the light gather toward the light-exit face 70. However, the light guide pattern 66 can also be a printing pattern, a sandblasting pattern or a dot injection molding pattern to influence total reflection of the light guide plate 56 to make the light proceed toward the light-exit face 70. In addition, the light guide pattern 66 can also be positioned partly on a different surface of the light guide plate 56, such as the surface of the light-exit face 70, to adjust the brightness distribution of the light leaving the light guide plate 56.

It should be noted that the arrow points show the main route of the light emitting from the light source 54 in the light guide plate 56. By special design of the light guide pattern 66, most of the light will be gathered to specific regions (shown by dotted lines in FIG. 3) on the light-exit face 70 before leaving the light guide plate 56. Because the light focuses on specific regions of the light-exit face 70, the light left from the light guide plate 56 will form a plurality of line-like line sources 72, 74 and the light source provided by the LEDs 50a, 50b, 50c will look like the light source provided by the conventional cold cathode fluorescent lamp. The number of the line-like line sources 72, 74 depends on the actual size of the display. In addition, in other embodiments, the light guide plate 56 of the backlight module 50 can also be strip-shaped, so that the light-exit face 70 is strip-shaped, making the light emitted from the light guide plate 56 forms a line-like line source. Furthermore, because the backlight module 50, according to the present invention, can provide light similar to the linear light provided by the conventional cold cathode fluorescent lamp (CCFL), the diffuser sheet 60 or other optical films in the backlight module 50 can keep the conventional design used in the backlight module that incorporates CCFLs, and therefore research and development costs are spared.

Because the light source 54 in the present invention is a directional light source, the light enters and is emitted from a side of the light guide plate 56. In contrast, the upper region of the light source 54 does not have any light emission, so dark areas may occur. However, the light mixing space 62 provides uniform brightness of light, including the upper region of the light source 54, by mixing the light emitted from the light guide plate 56 sufficiently before entering the diffuser sheet 60.

Because the LED light source 54 in the present invention has higher power than the conventional LED light source, a lower number of LED light sources 54 achieve the same illuminating effect of the conventional LED light source so that the packing cost is decreased. In addition, the heat dissipation ability of the backlight module 50 in the present invention is better than the conventional high power LED backlight module. Furthermore, the mixing effect can be improved by positioning the diffuser sheet 60 at a side of the LED source 54, thus the range of wavelength and brightness that can be used for the light source is expanded. The light source 54 design can also have more variety.

Figure 4:
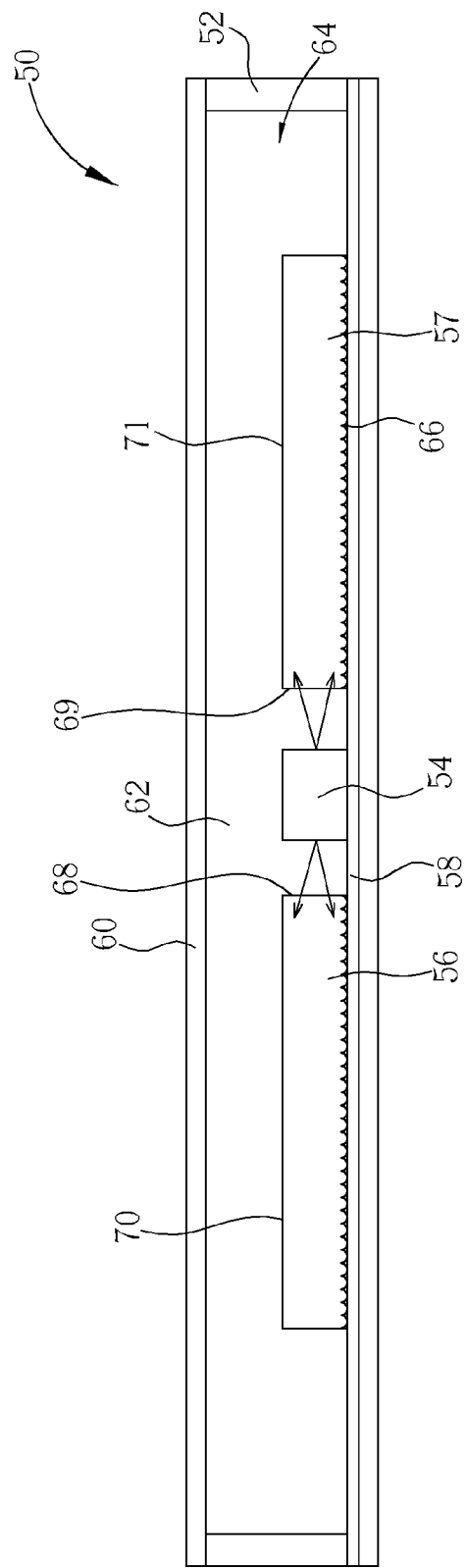
FIG. 4 shows a schematic diagram of the second embodiment of the backlight module of the present invention.

FIG. 4 shows a schematic diagram of a second embodiment of the backlight module of the present invention. In FIG. 4, the same number numerals as FIG. 3 designate similar or the same parts, regions or elements. In this embodiment, the light source 54 is a double-emitting light source positioned between two adjacent light guide plates 56, 57. The light-incidence faces 68, 69 of the light guide plates 56, 57 respectively are positioned on two sides of the light source 54 to guide the light emitted from the light source 54 to enter the light guide plate 56, 57 from the light-incidence faces 68, 69 of the light guide plates 56, 57. Furthermore, the light enters the light-incidence faces 68, 69 will pass through the light-exit faces 70, 71 respectively. The advantage of the present invention is that by using the double-emitting light source, the number of light sources can be decreased, and heat dissipation ability is increased. Furthermore, the space of the device is spared and electricity consumption is reduced.

In other embodiments, the light guide plate 56 can comprise two light-incidence faces 68 at the same time, and a light source 54 can be positioned at two sides of the light guide plate 56, so that the light can enter the light guide plate 56 from the different light-incidence faces 68, thus increasing the brightness.

Figure 5:
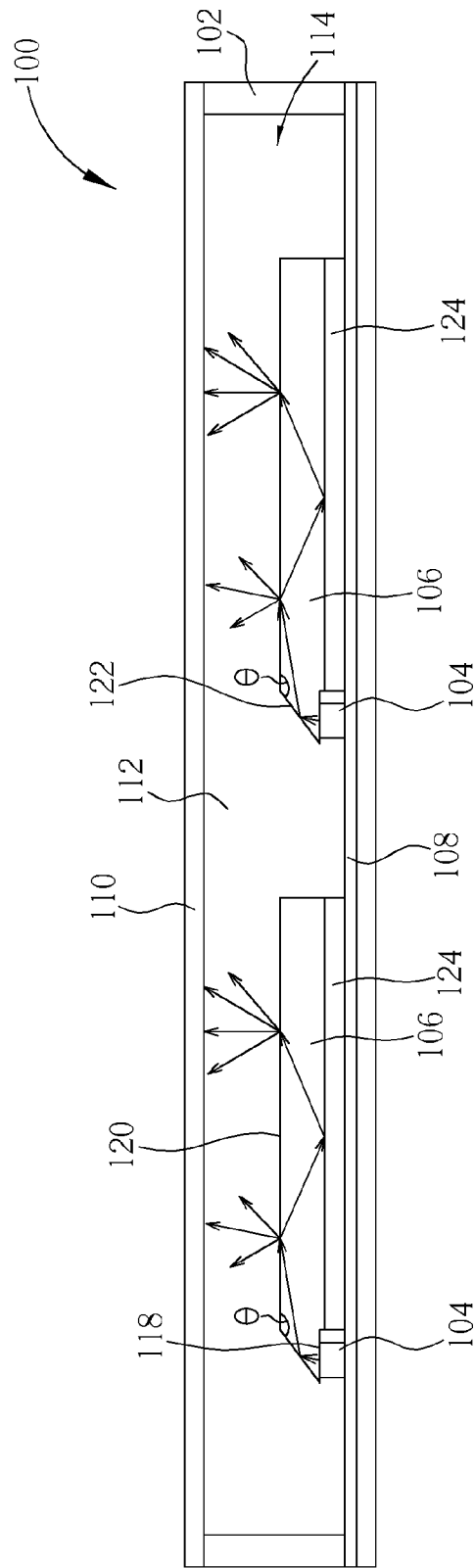
FIG. 5 shows a schematic diagram of the third embodiment of the backlight module of the present invention.

FIG. 5 shows a schematic diagram of a third embodiment of the backlight module of the present invention. The backlight module 100 comprises a frame 102 forming a containing space 114, at least two light guide plates 106, a light source 104 positioned at a side of the light guide plates 106, a reflective sheet 108 positioned under the light source 104 and the light guide plates 106, a diffuser sheet 110 positioned on the light source 104 and the light guide plates 106, and a light mixing space 112 surrounded by the diffuser sheet 110, the light source 104 and the light guide plates 106. The preferred light source in the present invention is a point light source, and a better light source is a top-emitting LED positioned on a PCB. Therefore, the light guide plates 106 are a little higher than the light source 104, and the light-incidence face 118 is positioned at a side of the light guide plates 106, which is parallel to the light-exit face 120. Thus, the light emitted from the top of the light source 104 can enter the light guide plates 106 from the light-incidence face 118 directly. Every light guide plate 106 can further comprise a reflective face 122 to reflect the light emitting from the light source 104 laterally toward the whole light guide plate 106, and the reflected light passing through the light-exit face 120 will become a plurality of line-like sources (as shown by the arrow in FIG. 5). Furthermore, an obtuse angle θ is positioned between the reflective face 122 and the light-exit face 120. However, the light guide plate 106 can be designed to let a little light emit into the upper part of the light guide plate 106 by using the reflective face 122 to adjust the light mixing effect and also improve the dark area problem. In this embodiment, a plurality of light guide patterns can be positioned on the surface of light guide plates 106 to adjust the direction of the light. For example, the light guide patterns can be a V-shaped type or U-shaped type or printing patterns, sandblasting patterns or dot injection molding positioned on the top or bottom surface of the light guide plate. Sandblasting patterns or dot injection molding can focus the light to form line-like sources. The arrow points show the route of light proceeding through the light guide plate 106. Most of the light focuses on several regions of the light guide plate 106 and forms line-like sources.

Furthermore, the backlight module 100 may comprise supporting structures 124 of a same number as the light guide plates 106. The supporting structures 124 are positioned under the light guide plates 106, and the thickness of the supporting structures 124 may be approximately larger than the height of the light source 104, so as to hold the light guide plate 106 a little higher than the light source 104. In addition, to increase the light utility efficiency, the preferred supporting structure 124 can have a reflective function to reflect the light emitted from the bottom of the light guide plate 106 back to the inside of the light guide plate 106 or to the light mixing space 112.

Figure 6:
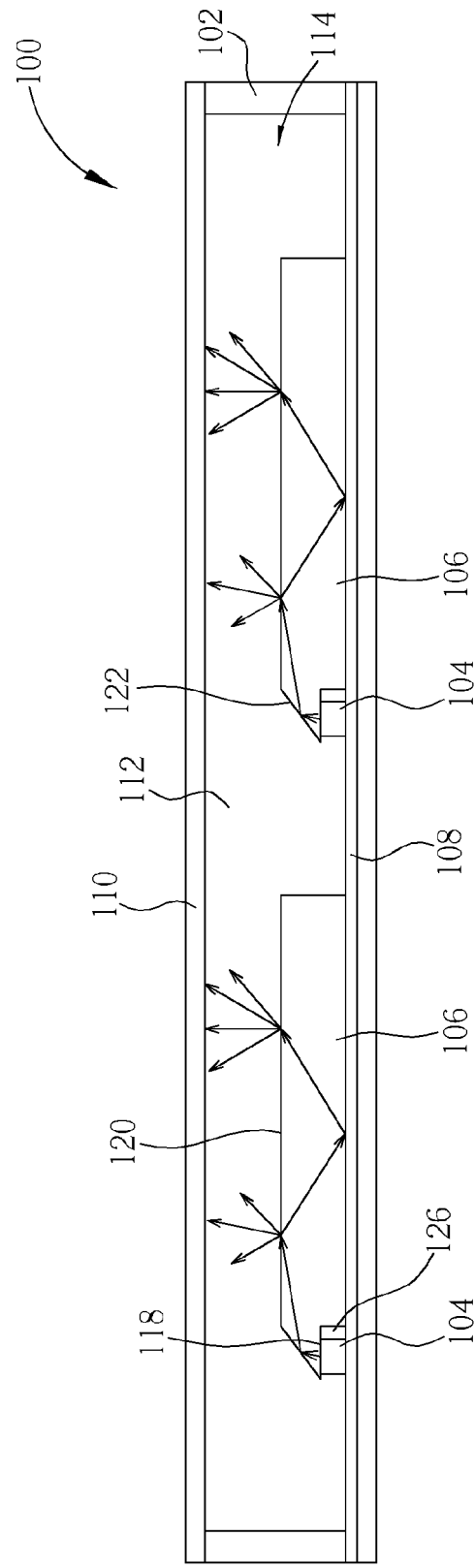
FIG. 6 shows a schematic diagram of the fourth embodiment of the backlight module of the present invention.

FIG. 6 shows a schematic diagram of a fourth embodiment of the backlight module of the present invention. In FIG. 6, the same reference numerals in FIG. 5 designate similar or the same parts, regions or elements. In this embodiment, the thickness of the light guide plate 106 is thicker than the light source 104, which is different from the third embodiment. The thicker light guide plate 106 replaces the supporting structure 124 of the third embodiment. The light guide plate 106 has a recessed space 126 positioned at a bottom side of the light guide plate 106, and the size of the recessed space 126 corresponds to the size of the light source 104 to hold the light source 104. Therefore, the light source 104 is buried in the light guide plate 106 and at least four sides of the light source 104 contact the surface of the recessed space 126. Furthermore, the light emitted from the top or the side of the light source 104 can illuminate the light guide plate 106 through the surface of the recessed space 126. So, the light source of this embodiment can be a top-emitting LED or a side-emitting LED, and the light-incidence face 118 of the light guide plate 106 can be positioned on any surface of the corresponding recessed space 126.

As mentioned above, the backlight module in the present invention comprises a plurality of point light sources, such as LEDs, disposed at a side of one or several light guide plates. Thus, the number of light sources can be decreased. In addition, the light guide patterns positioned on the light guide plate can change the point light source in the present invention into a line-like source by adjusting the brightness distribution on the light-exit face. By imitating the brightness distribution of the cold cathode fluorescent lamp, the LED backlight module in the present invention has the same effect as the conventional cold cathode fluorescent lamp, but it has lower cost, better heat dissipation, and is more environmentally friendly. Moreover, the conventional diffuser sheets and optical films used for cold cathode fluorescent lamps can still be applied to the backlight module in the present invention. Thus, research and development costs are spared. Finally, the light mixing space in the present invention makes the light mix sufficiently before entering the diffuser sheet to provide a uniform planar light source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module comprising:
   a light guide plate having a light-exit face and at least one light-incidence face, wherein the light-incidence face and the light-exit face of the light guide plate are opposed to each other collaterally;
   a light source positioned at a side of the light guide plate, wherein light emitted from the light source enters the light guide plate from the light-incidence face;
   a diffuser sheet positioned on the light guide plate without contacting the light guide plate and the light source, the diffuser sheet being parallel to the light-exit face of the light guide plate; and
   a light mixing space disposed between the diffuser sheet and the light guide plate wherein the light passing through the light-exit face mixes in the light mixing space before being emitted from the backlight module.

2. The backlight module of claim 1, wherein the light guide plate comprises at least a recessed space to hold the light source.

3. The backlight module of claim 1, further comprising a supporting structure positioned under the light guide plate to hold the light guide plate higher than the light source.

4. The backlight module of claim 3, wherein the supporting structure comprises a reflective element.

5. The backlight module of claim 1, wherein the light guide plate is strip-shaped to make the light passing through the light guide plate become a line-like source.

6. The backlight module of claim 1, wherein the light guide plate comprises a plurality of light guide patterns to guide the light toward the light-exit face, and make light passing through the light-exit face become a plurality of line-like sources.

7. The backlight module of claim 6, wherein the light guide pattern is a V-shaped type or a U-shaped type.

8. The backlight module of claim 1, further comprising a reflective sheet positioned under the light source and the light guide plate.

9. The backlight module of claim 1, further comprising a frame comprising a containing space to hold the light source, the light guide plate and the diffuser sheet, wherein the portion of the containing space surrounded by the light source, the light guide plate and the diffuser sheet forms the light mixing space.

10. The backlight module of claim 1, wherein the light guide plate comprises a reflective face to reflect the light entering the light guide plate laterally and make light passing through the light-exit face become a plurality of line-like sources, and an obtuse angle is between the reflective face and the light-exit face.

* * * * *